US008492028B2

(12) United States Patent
Itou et al.

(10) Patent No.: US 8,492,028 B2
(45) Date of Patent: Jul. 23, 2013

(54) POSITIVE ELECTRODE MATERIAL FOR NON-AQUEOUS ELECTROLYTE LITHIUM ION BATTERY AND BATTERY USING THE SAME

(75) Inventors: Takanori Itou, Hiratsuka (JP); Takamitsu Saito, Yokohama (JP); Hideaki Horie, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1455 days.

(21) Appl. No.: 10/581,858

(22) PCT Filed: Nov. 29, 2004

(86) PCT No.: PCT/JP2004/018085
§ 371 (c)(1),
(2), (4) Date: Jun. 30, 2006

(87) PCT Pub. No.: WO2005/055344
PCT Pub. Date: Jun. 16, 2005

(65) Prior Publication Data
US 2007/0082265 A1    Apr. 12, 2007

(30) Foreign Application Priority Data

Dec. 5, 2003   (JP) ............................... P2003-407542
Nov. 18, 2004  (JP) ............................... P2004-334800

(51) Int. Cl.
*H01M 4/13* (2010.01)

(52) U.S. Cl.
USPC ...................... 429/231.1; 429/218.1; 429/223

(58) Field of Classification Search
USPC ................ 429/231.3, 122–347, 218.1, 231.1
See application file for complete search history.

(56) References Cited

U.S. PATENT DOCUMENTS

| | | | |
|---|---|---|---|
| 5,427,875 A | 6/1995 | Yamamoto et al. | |
| 5,538,814 A * | 7/1996 | Kamauchi et al. | 429/303 |
| 5,783,328 A | 7/1998 | Wang | |
| 6,071,649 A * | 6/2000 | Mao et al. | 429/231.3 |
| 6,881,520 B1 | 4/2005 | Li | |
| 2002/0051904 A1* | 5/2002 | Itoh et al. | 429/149 |
| 2002/0076613 A1 | 6/2002 | Lee et al. | |
| 2003/0157409 A1* | 8/2003 | Huang | 429/306 |
| 2004/0096743 A1 | 5/2004 | Okae et al. | |
| 2004/0253518 A1 | 12/2004 | Hosoya et al. | |

FOREIGN PATENT DOCUMENTS

| | | |
|---|---|---|
| EP | 0 536 425 A1 | 4/1993 |
| JP | 04-328278 A | 11/1992 |
| JP | 07-245105 | 9/1995 |

(Continued)

OTHER PUBLICATIONS

Machine Translation of JP 09-050810 provided with previous Rejections.*

(Continued)

*Primary Examiner* — Basia Ridley
*Assistant Examiner* — Jonathan G Leong
(74) *Attorney, Agent, or Firm* — Foley & Lardner LLP

(57) ABSTRACT

A positive electrode material for non-aqueous electrolyte lithium ion battery (31, 41) of the present invention has an oxide (11) containing lithium and nickel, and a lithium compound (13) which is deposited on a surface of the oxide (11) and covers nickel present on the surface of the oxide (11). By this structure, it is possible to suppress decomposition of an electrolysis solution as much as possible and drastically reduce swelling of the batteries (31, 41).

4 Claims, 11 Drawing Sheets

FOREIGN PATENT DOCUMENTS

| | | | |
|---|---|---|---|
| JP | 09-050810 | * | 2/1997 |
| JP | 09-050810 A | | 2/1997 |
| JP | 2002-203552 A | | 2/1997 |
| JP | 09-050810 | * | 2/1999 |
| JP | 2000-515300 A | | 11/2000 |
| JP | 2002-203552 A | | 7/2002 |
| JP | 2002-231227 A | | 8/2002 |
| JP | 2003-123755 A | | 4/2003 |
| JP | 2003-173775 A | | 6/2003 |
| KR | 2000-0016626 | | 12/2004 |
| KR | 10-0635684 B1 | | 10/2006 |
| WO | WO 97/49136 | | 12/1997 |
| WO | WO 97/49136 A1 | | 12/1997 |
| WO | WO 99/57770 | | 11/1999 |

OTHER PUBLICATIONS

Machine Translation of JP H07-245105 to Nagayama originally published Sep. 1995.*

EP Communication in EP Appln No. 04 799 939.6 dated Jun. 24, 2010.

Japanese Office Action; JP No. 2004-334880; 6 pages, issued Dec. 28, 2010.

* cited by examiner

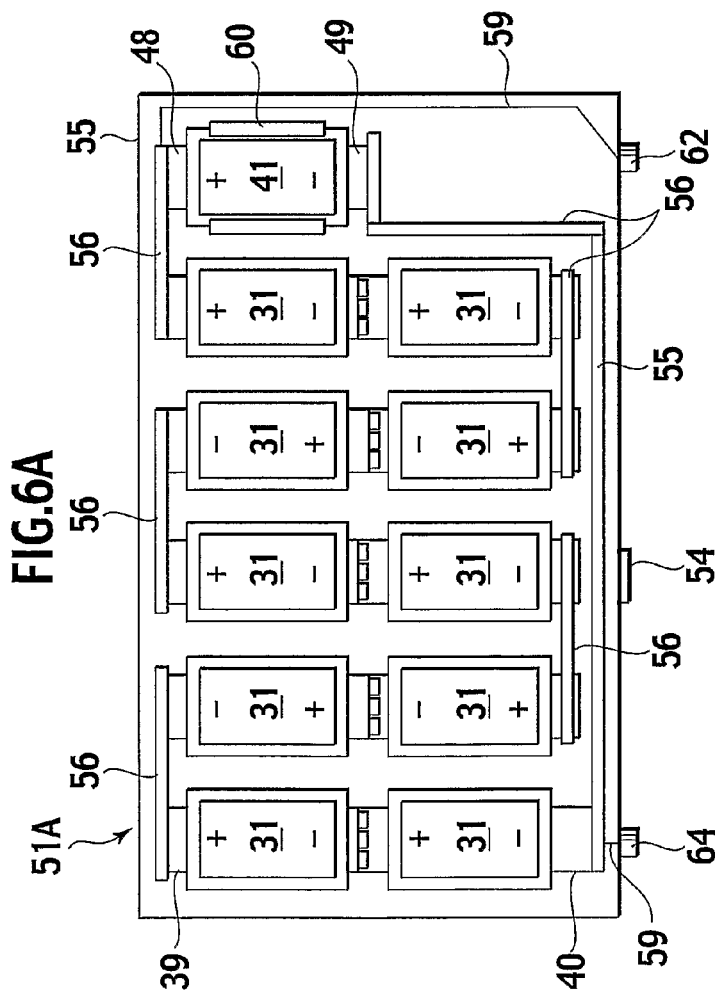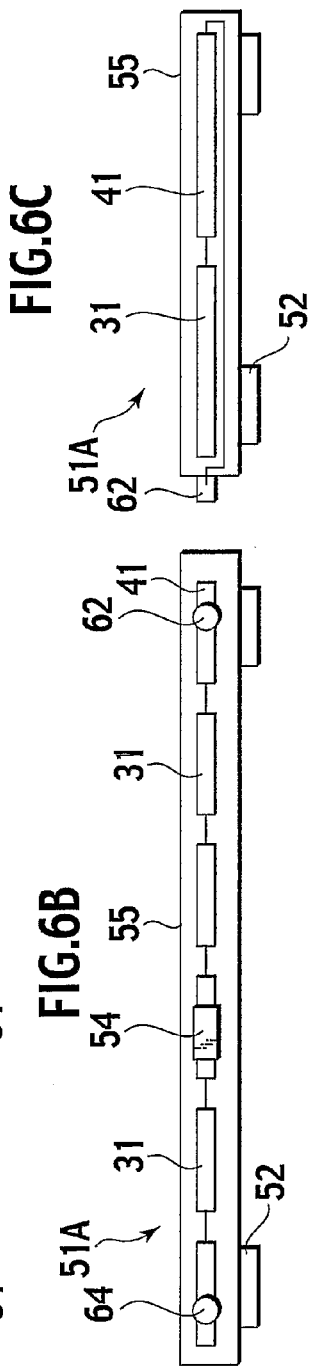

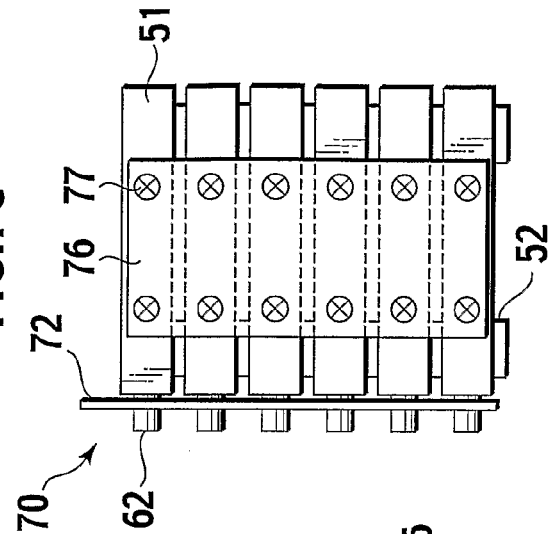
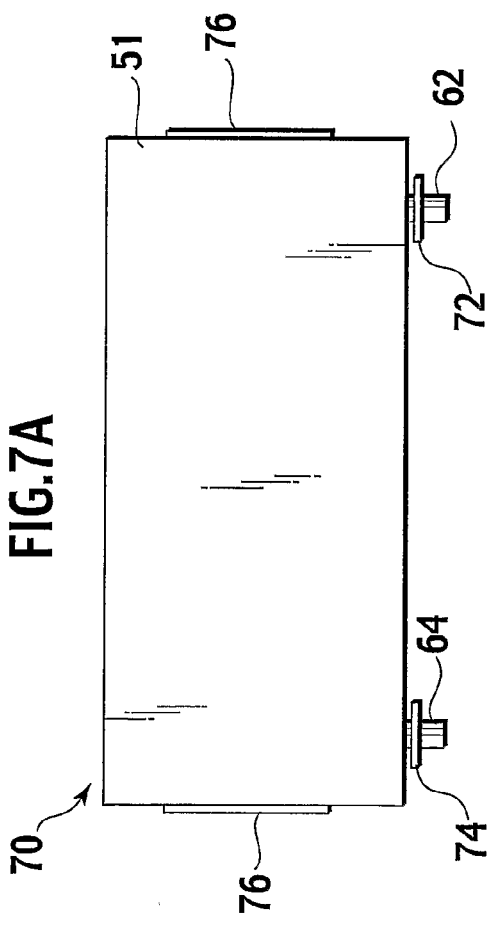
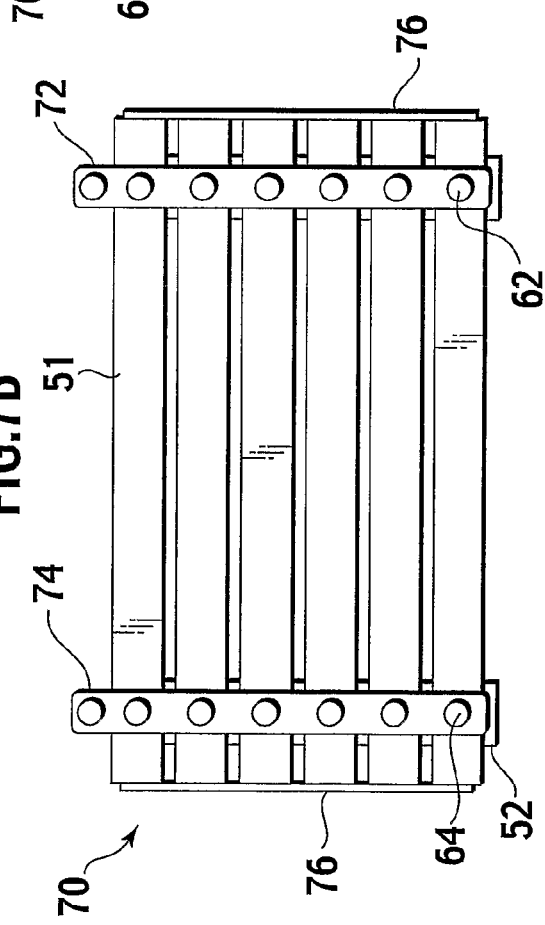

FIG.10

| | TYPE OF LiNi OXIDE COMPOSITE USED IN POSITIVE ELECTRODE ACTIVE MATERIAL | Li COMPOUND DEPOSITED | THICKNESS OF Li COMPOUND DEPOSITED(nm) | SWELL RATE OF CELL (%) | CELL'S INTERNAL RESISTANCE INCREASE RATE (%) |
|---|---|---|---|---|---|
| EXAMPLE 1 | $LiNi_{0.83}Co_{0.15}Al_{0.02}O_2$ | LITHIUM PHOSPHATE | 500 | 3 | 1.5 |
| EXAMPLE 2 | $LiNi_{0.83}Co_{0.15}Al_{0.02}O_2$ | $Li_{2.9}PO_{3.3}N_{0.36}$ | 500 | 2 | 1.6 |
| EXAMPLE 3 | $LiNi_{0.83}Co_{0.15}Al_{0.02}O_2$ | $Li_2O-B_2O_3$ | 500 | 2 | 1.4 |
| EXAMPLE 4 | $LiNi_{0.83}Co_{0.15}Al_{0.02}O_2$ | $Li_2O-B_2O_3-LiI$ | 500 | 3 | 1.5 |
| EXAMPLE 5 | $LiNi_{0.83}Co_{0.15}Al_{0.02}O_2$ | $Li_2S-SiS_2$ | 500 | 3 | 1.7 |
| EXAMPLE 6 | $LiNi_{0.83}Co_{0.15}Al_{0.02}O_2$ | $Li_2S-SiS_2-Li_3PO_4$ | 500 | 3 | 1.6 |
| EXAMPLE 7 | $LiNi_{0.83}Co_{0.15}Al_{0.02}O_2$ | LITHIUM COBALTATE | 500 | 2 | 1.4 |
| EXAMPLE 8 | $LiNi_{0.83}Co_{0.15}Al_{0.02}O_2$ | LITHIUM MANGANATE | 500 | 2 | 1.4 |
| EXAMPLE 9 | $LiNi_{0.83}Co_{0.15}Al_{0.02}O_2$ | $LiFePO_4$ | 500 | 3 | 1.7 |
| EXAMPLE 10 | $LiNi_{0.83}Co_{0.15}Al_{0.02}O_2$ | LITHIUM HYDROXIDE | 500 | 3 | 1.5 |
| EXAMPLE 11 | $LiNi_{0.83}Co_{0.15}Al_{0.02}O_2$ | LITHIUM FLUORIDE | 500 | 3 | 1.6 |
| EXAMPLE 12 | $LiNi_{0.83}Co_{0.15}Al_{0.02}O_2$ | LITHIUM ACETATE | 500 | 2 | 2.3 |
| EXAMPLE 13 | $LiNi_{0.83}Co_{0.15}Al_{0.02}O_2$ | LITHIUM ACETYLIDE-ETHYLENEDIAMINE | 500 | 3 | 2.2 |
| EXAMPLE 14 | $LiNi_{0.83}Co_{0.15}Al_{0.02}O_2$ | LITHIUM BENZOATE | 500 | 1 | 2.4 |
| EXAMPLE 15 | $LiNi_{0.83}Co_{0.15}Al_{0.02}O_2$ | LITHIUM BROMIDE | 500 | 2 | 2.5 |
| EXAMPLE 16 | $LiNi_{0.83}Co_{0.15}Al_{0.02}O_2$ | LITHIUM CARBONATE | 500 | 2 | 2.3 |
| EXAMPLE 17 | $LiNi_{0.83}Co_{0.15}Al_{0.02}O_2$ | LITHIUM NITRATE | 500 | 1 | 2.2 |
| EXAMPLE 18 | $LiNi_{0.83}Co_{0.15}Al_{0.02}O_2$ | LITHIUM OXALATE | 500 | 3 | 2.5 |
| EXAMPLE 19 | $LiNi_{0.83}Co_{0.15}Al_{0.02}O_2$ | LITHIUM PYRUVATE | 500 | 1 | 2.6 |
| EXAMPLE 20 | $LiNi_{0.83}Co_{0.15}Al_{0.02}O_2$ | LITHIUM STEARATE | 500 | 1 | 2.3 |
| EXAMPLE 21 | $LiNi_{0.83}Co_{0.15}Al_{0.02}O_2$ | LITHIUM TARTRATE | 500 | 1 | 2.3 |
| EXAMPLE 85 | $LiNi_{0.83}Co_{0.15}Al_{0.02}O_2$ | LITHIUM SULFATE | 500 | 1 | 2.1 |
| COMPARATIVE EXAMPLE 1 | $LiNi_{0.83}Co_{0.15}Al_{0.02}O_2$ | NONE | - | 15 | 2.7 |

FIG.11

| | TYPE OF LiNi OXIDE COMPOSITE USED IN POSITIVE ELECTRODE ACTIVE MATERIAL | Li COMPOUND DEPOSITED | THICKNESS OF Li COMPOUND DEPOSITED(nm) | SWELL RATE OF CELL (%) | CELL'S INTERNAL RESISTANCE INCREASE RATE (%) |
|---|---|---|---|---|---|
| EXAMPLE 22 | $LiNi_{0.5}Mn_{0.5}O_2$ | LITHIUM PHOSPHATE | 500 | 2 | 2.0 |
| EXAMPLE 23 | $LiNi_{0.5}Mn_{0.5}O_2$ | $Li_{2.9}PO_{3.3}N_{0.36}$ | 500 | 2 | 1.8 |
| EXAMPLE 24 | $LiNi_{0.5}Mn_{0.5}O_2$ | $Li_2O-B_2O_3$ | 500 | 2 | 1.9 |
| EXAMPLE 25 | $LiNi_{0.5}Mn_{0.5}O_2$ | $Li_2O-B_2O_3-LiI$ | 500 | 3 | 2.1 |
| EXAMPLE 26 | $LiNi_{0.5}Mn_{0.5}O_2$ | $Li_2S-SiS_2$ | 500 | 1 | 1.7 |
| EXAMPLE 27 | $LiNi_{0.5}Mn_{0.5}O_2$ | $Li_2S-SiS_2-Li_3PO_4$ | 500 | 1 | 1.6 |
| EXAMPLE 28 | $LiNi_{0.5}Mn_{0.5}O_2$ | LITHIUM COBALTATE | 500 | 1 | 1.9 |
| EXAMPLE 29 | $LiNi_{0.5}Mn_{0.5}O_2$ | LITHIUM MANGANATE | 500 | 2 | 2.0 |
| EXAMPLE 30 | $LiNi_{0.5}Mn_{0.5}O_2$ | $LiFePO_4$ | 500 | 3 | 2.1 |
| EXAMPLE 31 | $LiNi_{0.5}Mn_{0.5}O_2$ | LITHIUM HYDROXIDE | 500 | 1 | 1.8 |
| EXAMPLE 32 | $LiNi_{0.5}Mn_{0.5}O_2$ | LITHIUM FLUORIDE | 500 | 1 | 1.9 |
| EXAMPLE 33 | $LiNi_{0.5}Mn_{0.5}O_2$ | LITHIUM ACETATE | 500 | 2 | 3.0 |
| EXAMPLE 34 | $LiNi_{0.5}Mn_{0.5}O_2$ | LITHIUM ACETYLIDE-ETHYLENEDIAMINE | 500 | 3 | 2.9 |
| EXAMPLE 35 | $LiNi_{0.5}Mn_{0.5}O_2$ | LITHIUM BENZOATE | 500 | 1 | 3.1 |
| EXAMPLE 36 | $LiNi_{0.5}Mn_{0.5}O_2$ | LITHIUM BROMIDE | 500 | 1 | 3.1 |
| EXAMPLE 37 | $LiNi_{0.5}Mn_{0.5}O_2$ | LITHIUM CARBONATE | 500 | 2 | 3.0 |
| EXAMPLE 38 | $LiNi_{0.5}Mn_{0.5}O_2$ | LITHIUM NITRATE | 500 | 2 | 3.2 |
| EXAMPLE 39 | $LiNi_{0.5}Mn_{0.5}O_2$ | LITHIUM OXALATE | 500 | 3 | 3.1 |
| EXAMPLE 40 | $LiNi_{0.5}Mn_{0.5}O_2$ | LITHIUM PYRUVATE | 500 | 3 | 2.9 |
| EXAMPLE 41 | $LiNi_{0.5}Mn_{0.5}O_2$ | LITHIUM STEARATE | 500 | 3 | 2.5 |
| EXAMPLE 42 | $LiNi_{0.5}Mn_{0.5}O_2$ | LITHIUM TARTRATE | 500 | 3 | 2.9 |
| EXAMPLE 86 | $LiNi_{0.5}Mn_{0.5}O_2$ | LITHIUM SULFATE | 500 | 2 | 2.3 |
| COMPARATIVE EXAMPLE 2 | $LiNi_{0.5}Mn_{0.5}O_2$ | NONE | - | 10 | 3.5 |

FIG.12

| | TYPE OF LiNi OXIDE COMPOSITE USED IN POSITIVE ELECTRODE ACTIVE MATERIAL | Li COMPOUND DEPOSITED | THICKNESS OF Li COMPOUND DEPOSITED(nm) | SWELL RATE OF CELL (%) | CELL'S INTERNAL RESISTANCE INCREASE RATE (%) |
|---|---|---|---|---|---|
| EXAMPLE 43 | $LiNi_{0.83}Co_{0.15}Al_{0.02}O_2$ | LITHIUM PHOSPHATE | 1 | 5 | 1.3 |
| EXAMPLE 44 | $LiNi_{0.83}Co_{0.15}Al_{0.02}O_2$ | $Li_{2.9}PO_{3.3}N_{0.36}$ | 1 | 6 | 1.4 |
| EXAMPLE 45 | $LiNi_{0.83}Co_{0.15}Al_{0.02}O_2$ | $Li_2O-B_2O_3$ | 1 | 5 | 1.3 |
| EXAMPLE 46 | $LiNi_{0.83}Co_{0.15}Al_{0.02}O_2$ | $Li_2O-B_2O_3-LiI$ | 1 | 6 | 1.5 |
| EXAMPLE 47 | $LiNi_{0.83}Co_{0.15}Al_{0.02}O_2$ | $Li_2S-SiS_2$ | 1 | 5 | 1.6 |
| EXAMPLE 48 | $LiNi_{0.83}Co_{0.15}Al_{0.02}O_2$ | $Li_2S-SiS_2-Li_3PO_4$ | 1 | 5 | 1.4 |
| EXAMPLE 49 | $LiNi_{0.83}Co_{0.15}Al_{0.02}O_2$ | LITHIUM COBALTATE | 1 | 5 | 1.5 |
| EXAMPLE 50 | $LiNi_{0.83}Co_{0.15}Al_{0.02}O_2$ | LITHIUM MANGANATE | 1 | 6 | 1.3 |
| EXAMPLE 51 | $LiNi_{0.83}Co_{0.15}Al_{0.02}O_2$ | $LiFePO_4$ | 1 | 4 | 1.4 |
| EXAMPLE 52 | $LiNi_{0.83}Co_{0.15}Al_{0.02}O_2$ | LITHIUM HYDROXIDE | 1 | 4 | 1.2 |
| EXAMPLE 53 | $LiNi_{0.83}Co_{0.15}Al_{0.02}O_2$ | LITHIUM FLUORIDE | 1 | 5 | 1.6 |
| EXAMPLE 54 | $LiNi_{0.83}Co_{0.15}Al_{0.02}O_2$ | LITHIUM ACETATE | 1 | 4 | 1.4 |
| EXAMPLE 55 | $LiNi_{0.83}Co_{0.15}Al_{0.02}O_2$ | LITHIUM ACETYLIDE-ETHYLENEDIAMINE | 1 | 4 | 2.3 |
| EXAMPLE 56 | $LiNi_{0.83}Co_{0.15}Al_{0.02}O_2$ | LITHIUM BENZOATE | 1 | 5 | 2.4 |
| EXAMPLE 57 | $LiNi_{0.83}Co_{0.15}Al_{0.02}O_2$ | LITHIUM BROMIDE | 1 | 6 | 2.2 |
| EXAMPLE 58 | $LiNi_{0.83}Co_{0.15}Al_{0.02}O_2$ | LITHIUM CARBONATE | 1 | 4 | 2.6 |
| EXAMPLE 59 | $LiNi_{0.83}Co_{0.15}Al_{0.02}O_2$ | LITHIUM NITRATE | 1 | 4 | 2.5 |
| EXAMPLE 60 | $LiNi_{0.83}Co_{0.15}Al_{0.02}O_2$ | LITHIUM OXALATE | 1 | 4 | 2.2 |
| EXAMPLE 61 | $LiNi_{0.83}Co_{0.15}Al_{0.02}O_2$ | LITHIUM PYRUVATE | 1 | 6 | 2.3 |
| EXAMPLE 62 | $LiNi_{0.83}Co_{0.15}Al_{0.02}O_2$ | LITHIUM STEARATE | 1 | 6 | 2.4 |
| EXAMPLE 63 | $LiNi_{0.83}Co_{0.15}Al_{0.02}O_2$ | LITHIUM TARTRATE | 1 | 5 | 2.3 |
| EXAMPLE 87 | $LiNi_{0.83}Co_{0.15}Al_{0.02}O_2$ | LITHIUM SULFATE | 1 | 5 | 2.1 |
| COMPARATIVE EXAMPLE 3 | $LiNi_{0.83}Co_{0.15}Al_{0.02}O_2$ | NONE | - | 17 | 2.7 |

FIG.13

| | TYPE OF LiNi OXIDE COMPOSITE USED IN POSITIVE ELECTRODE ACTIVE MATERIAL | Li COMPOUND DEPOSITED | THICKNESS OF Li COMPOUND DEPOSITED(nm) | SWELL RATE OF CELL (%) | CELL'S INTERNAL RESISTANCE INCREASE RATE (%) |
|---|---|---|---|---|---|
| EXAMPLE 64 | $LiNi_{0.5}Mn_{0.5}O_2$ | LITHIUM PHOSPHATE | 1 | 6 | 1.4 |
| EXAMPLE 65 | $LiNi_{0.5}Mn_{0.5}O_2$ | $Li_{2.9}PO_{3.3}N_{0.36}$ | 1 | 4 | 1.2 |
| EXAMPLE 66 | $LiNi_{0.5}Mn_{0.5}O_2$ | $Li_2O-B_2O_3$ | 1 | 4 | 1.3 |
| EXAMPLE 67 | $LiNi_{0.5}Mn_{0.5}O_2$ | $Li_2O-B_2O_3-LiI$ | 1 | 4 | 1.4 |
| EXAMPLE 68 | $LiNi_{0.5}Mn_{0.5}O_2$ | $Li_2S-SiS_2$ | 1 | 6 | 1.3 |
| EXAMPLE 69 | $LiNi_{0.5}Mn_{0.5}O_2$ | $Li_2S-SiS_2-Li_3PO_4$ | 1 | 6 | 1.2 |
| EXAMPLE 70 | $LiNi_{0.5}Mn_{0.5}O_2$ | LITHIUM COBALTATE | 1 | 5 | 1.3 |
| EXAMPLE 71 | $LiNi_{0.5}Mn_{0.5}O_2$ | LITHIUM MANGANATE | 1 | 4 | 1.4 |
| EXAMPLE 72 | $LiNi_{0.5}Mn_{0.5}O_2$ | $LiFePO_4$ | 1 | 4 | 1.2 |
| EXAMPLE 73 | $LiNi_{0.5}Mn_{0.5}O_2$ | LITHIUM HYDROXIDE | 1 | 4 | 1.5 |
| EXAMPLE 74 | $LiNi_{0.5}Mn_{0.5}O_2$ | LITHIUM FLUORIDE | 1 | 6 | 1.2 |
| EXAMPLE 75 | $LiNi_{0.5}Mn_{0.5}O_2$ | LITHIUM ACETATE | 1 | 4 | 2.3 |
| EXAMPLE 76 | $LiNi_{0.5}Mn_{0.5}O_2$ | LITHIUM ACETYLIDE-ETHYLENEDIAMINE | 1 | 5 | 2.4 |
| EXAMPLE 77 | $LiNi_{0.5}Mn_{0.5}O_2$ | LITHIUM BENZOATE | 1 | 4 | 2.3 |
| EXAMPLE 78 | $LiNi_{0.5}Mn_{0.5}O_2$ | LITHIUM BROMIDE | 1 | 6 | 2.2 |
| EXAMPLE 79 | $LiNi_{0.5}Mn_{0.5}O_2$ | LITHIUM CARBONATE | 1 | 5 | 2.5 |
| EXAMPLE 80 | $LiNi_{0.5}Mn_{0.5}O_2$ | LITHIUM NITRATE | 1 | 6 | 2.3 |
| EXAMPLE 81 | $LiNi_{0.5}Mn_{0.5}O_2$ | LITHIUM OXALATE | 1 | 5 | 2.5 |
| EXAMPLE 82 | $LiNi_{0.5}Mn_{0.5}O_2$ | LITHIUM PYRUVATE | 1 | 5 | 2.3 |
| EXAMPLE 83 | $LiNi_{0.5}Mn_{0.5}O_2$ | LITHIUM STEARATE | 1 | 5 | 2.5 |
| EXAMPLE 84 | $LiNi_{0.5}Mn_{0.5}O_2$ | LITHIUM TARTRATE | 1 | 6 | 2.3 |
| EXAMPLE 88 | $LiNi_{0.5}Mn_{0.5}O_2$ | LITHIUM SULFATE | 1 | 6 | 2.2 |
| COMPARATIVE EXAMPLE 4 | $LiNi_{0.5}Mn_{0.5}O_2$ | NONE | - | 10 | 3.5 |

POSITIVE ELECTRODE MATERIAL FOR NON-AQUEOUS ELECTROLYTE LITHIUM ION BATTERY AND BATTERY USING THE SAME

TECHNICAL FIELD

The present invention relates to a positive electrode material for a non-aqueous electrolyte lithium ion battery using a lithium nickel oxide (Li—Ni oxide) for a positive electrode active material, and relates to a non-aqueous electrolyte lithium ion battery using the same.

BACKGROUND ART

Currently, lithium ion secondary batteries have been commercialized as non-aqueous electrolyte secondary batteries for portable devices such as mobile phones. As weight and thickness of the portable devices are reduced, the non-aqueous electrolyte lithium ion secondary batteries themselves need to be thinner. Recently, thin batteries each using a laminate film as a sheath material are developed, and a laminate-type thin batteries are being put into practical use in which a positive electrode active material is a lithium cobalt oxide ($LiCoO_2$), a negative electrode active material is a graphite material or carbon material, and a non-aqueous electrolyte is a lithium salt dissolved in an organic solvent or a polymer electrolyte.

Moreover, along with an increase in functions and enhancement of performance of the portable devices in recent years, power consumption of the devices is increasing. Batteries as power supplies thereof have been strongly required to increase capacities. Accordingly, Li—Ni oxide ($LiNiO_2$, $Li_xNi_{1-a-b}CO_aAl_bO_2$), which can be expected to have higher capacity than conventional lithium-cobalt oxide, is being developed.

In recent years, aside from such an application, to promote introduction of electric vehicles (EVs), hybrid electric vehicles (HEVs), and fuel cell vehicles (FCVs) against a backdrop of rising environmental movement, power supplies for motor drive applications, auxiliary hybrid power supplies, and the like are being developed. For such applications, the non-aqueous electrolyte lithium ion secondary batteries, which can be repeatedly charged and discharged, are used. For applications which require high output and high energy density like motor drive applications for EVs, HEVs, FCVs, and the like, a single large battery cannot be fabricated practically, and an assembled battery composed of a plurality of batteries connected in series is generally used. As a battery constituting such an assembled battery, it has been proposed to use a laminate-type thin non-aqueous electrolyte lithium ion battery (just referred to as a thin laminate battery).

In a thin laminate battery in the applications requiring high output and high energy density, a metallic sheet material is used as a sheath member of the battery. The sheath member of this thin laminate battery is rectangular when viewed from the top and has a predetermined flat shape.

The thin laminate battery is lightweight because the thin laminate battery individually does not have a container made of metal. Moreover, when high voltage inside the container due to overcharge or the like causes rapture, shock is smaller than that in the metallic container. Accordingly, the thin laminate battery is suitable for applications which require high output and high energy density such as motor drive applications for EVs, HEVs, and FCVs.

Furthermore, in such thin laminate batteries, the requirement for increased capacity is further strengthened like the case of the aforementioned portable devices. Accordingly, the Li—Ni oxide, which can be expected to have higher capacity than the conventional lithium cobalt oxide, is being developed.

However, the Li—Ni battery using a positive electrode material including this Li—Ni oxide as the positive electrode active material (just referred to as a Li—Ni positive electrode material) has a problem that oxygen ions are oxidized by nickel ions with high valence within the positive electrode material into oxygen radicals and released to decompose an electrolysis solution. A large amount of gas is generated in the battery using the positive electrode material when the battery is initially charged or stored at high temperature, and the battery greatly swells.

To solve the aforementioned problem, the Japanese Patent Application Laid-Open No. 2002-203552 discloses a method of suppressing the gas formation by controlling pH of the positive electrode material.

DISCLOSURE OF THE INVENTION

However, in the method described in the aforementioned literature, the positive electrode active material is obtained by coprecipitation from a hydroxide which is a raw material, and hydroxyl groups remain on the surface. This method suppresses the radicals with the hydroxyl groups remaining on the surface but is effective only when moisture enters the battery. The method cannot function well in charge and discharge at high temperature (60° C. or higher) in a high voltage state (charged state) even when the alkalescence of the material is suppressed by controlling the pH. In other words, in the high voltage state, this constitution does not effectively function because the reaction naturally progresses at high temperature to generate gas in a high voltage state.

The present invention was made in the light of the aforementioned conventional art, and an object of the present invention is to provide a positive electrode material of a non-aqueous electrolyte lithium ion battery, which can suppress a decomposition of an electrolysis solution even when a battery is charged or stored at high temperature. Further, an object of the present invention is to provide a battery using the same, an assembled battery composed of a plurality of the batteries connected, and vehicles with these mounted.

The first aspect of the present invention provides a positive electrode material for non-aqueous electrolyte lithium ion battery comprising: an oxide containing lithium and nickel; and a lithium compound deposited on a surface of the oxide, the lithium compound covering nickel present on the surface of the oxide.

The second aspect of the present invention provides a non-aqueous electrolyte lithium ion battery comprising: a positive electrode material including: an oxide containing lithium and nickel; and a lithium compound deposited on a surface of the oxide, the lithium compound covering nickel present on the surface of the oxide.

The third aspect of the present invention provides an assembled battery comprising: non-aqueous electrolyte lithium ion batteries, each including: a positive electrode material having: an oxide containing lithium and nickel; and a lithium compound deposited on a surface of the oxide, the lithium compound covering nickel present on the surface of the oxide, wherein the lithium ion batteries are connected and installed in series or in parallel.

The fourth aspect of the present invention provides a combined assembled battery comprising: assembled batteries, each comprising: non-aqueous electrolyte lithium ion batteries, each including: a positive electrode material having: an oxide containing lithium and nickel; and a lithium compound deposited on a surface of the oxide, the lithium compound covering nickel present on the surface of the oxide, wherein the lithium ion batteries are connected and installed in series or in parallel.

BRIEF DESCRIPTION OF DRAWINGS

FIG. 6A is a plan view showing another example of the assembled battery using the lithium ion secondary battery of the present invention;

FIG. 6B is a front view showing the another example of the assembled battery using the lithium ion secondary battery of the present invention;

FIG. 6C is a side view showing the another example of the assembled battery using the lithium ion secondary battery of the present invention;

FIG. 7A is a plan view showing a combined assembled battery using the lithium ion secondary battery of the present invention;

FIG. 7B is a front view showing the combined assembled battery using the lithium ion secondary battery of the present invention;

FIG. 7C is a side view showing the combined assembled battery using the lithium ion secondary battery of the present invention;

FIGS. 10 to 13 are views showing structures and results of Examples and Comparative Examples.

BEST MODE FOR CARRYING OUT THE INVENTION

Figure 1:
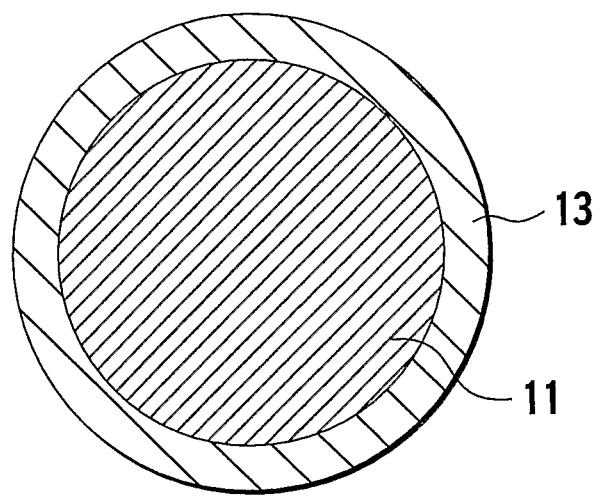
FIG. 1 is a cross-sectional view showing a particle of a Li—Ni oxide used in a positive electrode material of the present invention with a Li compound deposited so as to cover the surface thereof.

Embodiments of the present invention will be explained below with reference to the drawings, wherein like numbers are designated by like reference characters.

A positive electrode material of a non-aqueous electrolyte lithium ion battery according to the present invention contains a lithium-nickel oxide with a lithium compound deposited on the surface thereof. The lithium compound is characterized by covering nickel present on the surface of the lithium-nickel oxide so that the nickel is not exposed in the surface of the oxide as much as possible. This prevents generation of oxygen radicals due to the nickel ions present on the surface to minimize gas generation.

The Li—Ni oxide which can be used in the positive electrode material of the present invention is not particularly limited if the oxide is used as a positive electrode active material. The Li—Ni oxide includes a lithium-nickel based composite oxide mainly composed of lithium and nickel. As the Li—Ni oxide, in addition to LiNiO$_2$, it is possible to use Li—Ni oxide composite with part of nickel metal substituted with an element of another transition metal or the like, for example, LiNi$_x$Co$_{1-x}$O$_2$ (0<x<1), a lithium-nickel based composite oxide expressed by the following Formula I.

$$Li_aNi_bCo_cMn_dMeO_{2-x-y}N_y \quad \text{Formula I}$$

where $0 \leq a \leq 1.2$, $0.3 \leq b \leq 0.85$, $0 \leq c \leq 0.4$, $0 \leq d \leq 0.6$, $0 \leq e \leq 0.1$, $0.9 \leq b+c+d+e \leq 1.2$, $-0.05 \leq x \leq 0.1$, and $0 \leq y \leq 0.05$; M is at least one of Al, Mg, Ca, Ti, V, Cr, Fe, and Ga; and N is at least one of F, Cl, and S.

The compositions of these Li—Ni oxide composite can be measured by an inductively coupled plasma atomic emission spectrometer (ICP-AES), atomic absorption method, a fluorescent X-ray method, a particle analyzer, or the like.

Figure 9:
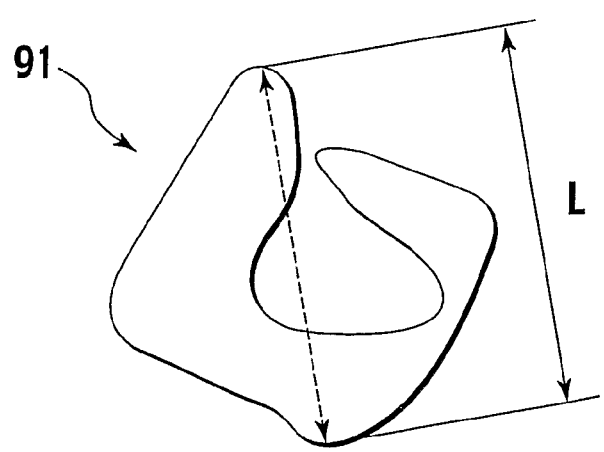
FIG. 9 is a view explaining an absolute maximum length used in measurement of the diameter of a particle.

In the light of higher capacity, reactivity, and cycle endurance of the Li—Ni oxide as the positive electrode active material, it is desirable that mean diameter of the Li—Ni oxide particles of the aforementioned positive electrode active material ranges from 0.1 to 20 μm. When the Li—Ni oxide forms secondary particles, it is desirable that the mean diameter of primary particles constituting the secondary particles ranges from 0.01 to 5 μm. However, the Li—Ni oxide is not necessarily formed into secondary particles by being aggregated or agglomerated. The diameter of the Li—Ni oxide particles and the diameter of the primary particles can be measured by, for example, a scanning electron microscope (SEM) or a transmission electron microscope (TEM). The Li—Ni oxide and the Li—Ni oxide with the Li compound deposited thereon can take different shapes depending on types and manufacturing methods thereof and the like and is shaped in a sphere, a plate, a needle, a column, a block, and the like. Any shape of these can be used without difficulty. It is desirable to properly select an optimal shape which can improve battery properties such as charge/discharge characteristics. The aforementioned diameter of the Li—Ni oxide particles is expressed by an absolute maximum length because of uneven shape of the particles. Herein, the absolute maximum length is, as shown in FIG. 9, a maximum length L of distances between two arbitrary points on a contour of a particle 91.

Next, as the Li compound deposited on the surface of the aforementioned Li—Ni oxide, a compound including Li ion conductivity is preferred. The Li ion conductive compound has a low internal resistance increase when deposited by covering or sprinkling as described later. On the contrary, with a compound having no Li ion conductivity, deposited part acts as resistance. Accordingly, the battery properties may be affected while it is possible to suppress decomposition of the electrolysis solution and prevent swelling, which are objects of the present invention. In the present invention, therefore, the Li-ion conductive compound is preferred. Desirably, such a Li compound is at least one selected from a group consisting lithium phosphate, lithium phosphorus oxynitride (LiPON), Li$_2$O—B$_2$O$_3$ compound, Li$_2$O—B$_2$O$_3$—LiI compound, Li$_2$O—SiS$_2$ compound, Li$_2$S—SiS$_2$—Li$_3$PO$_4$ compound, lithium cobaltate, lithium manganate, LiFeO$_4$, and lithium hydroxide. In addition to these, it is possible to use lithium acetate, lithium acetylide-ethylenediamine complex, lithium benzoate, lithium carbonate, lithium fluoride, lithium oxalate, lithium pyruvate, lithium stearate, lithium tartrate, lithium bromide, lithium iodide, $Li_2S$—$SiS_2$, lithium sulfate, or the like. These may be used singularly or in combination of two or more thereof. Compositions of these Li compounds can be measured by the ICP, atomic absorption method, fluorescent X-ray method, particle analyzer, or the like.

As described above, desirably, the aforementioned Li compound is a Li-ion conductive compound, and specifically, a compound with a Li-ion conductivity of not less than $10^{-15}$ $S \cdot m^{-1}$, preferably, $10^{-12}$ $S \cdot m^{-1}$. The Li-ion conductivity can be measured by an AC impedance method, a constant potential step method, constant current step method, or the like.

Figure 2:
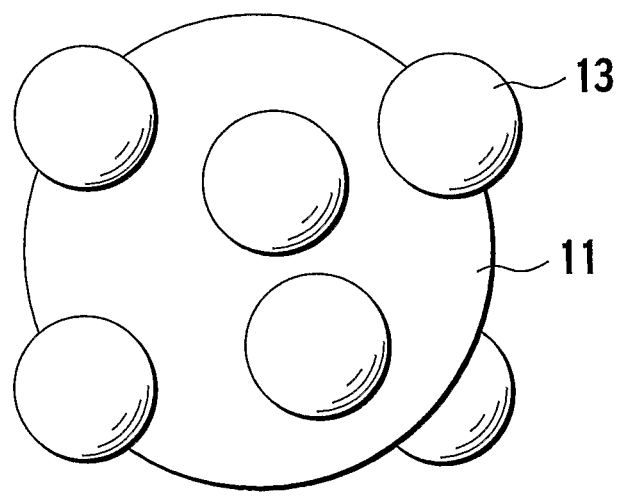
FIG. 2 is a schematic view showing a particle of the Li—Ni oxide used in the positive electrode material of the present invention with the Li compound deposited so as to sprinkle on the surface thereof.

The aforementioned Li compound only needs to be deposited on the surface of the Li—Ni oxide. Specifically, as shown in FIG. 1, a Li compound 13 may be deposited so as to cover the surface of a Li—Ni oxide 11, or as shown in FIG. 2, the Li compound 13 may be deposited so as to sprinkle on the surface of the Li—Ni oxide. The surface of the Li—Ni oxide here is the surface of particles of the Li—Ni oxide as shown in the drawing. In the case where the Li—Ni oxide is formed into secondary particles, the surface of the Li—Ni oxide may be the surface of primary particles, the surface of the secondary particles composed of the primary particles aggregated, or surfaces of these both particles. In other words, the Li compound only needs to be deposited on at least any of the secondary particles or primary particles. FIGS. 1 and 2 show examples of the secondary particle but can be considered as schematic expression of deposition of the Li compound to the primary particles when the Li—Ni oxide 11 in the drawing is substituted for the primary particles.

In terms of influences of the attachment by the covering and sprinkling on the performance, first, the covering provides a better performance for swelling of the battery (see FIGS. 10 to 13). This is because, when the Li—Ni oxide surface is fully covered with the Li compound, oxygen radicals are not emitted into the electrolysis solution. On the other hand, when the Li compound sprinkles on the Li—Ni oxide surface, some oxygen radicals are emitted.

In terms of the influences of the deposition by the covering and sprinkling on the performances, the sprinkling provides a better performance for the increase in the internal resistance (see FIGS. 10 to 13). This is because, when the Li—Ni oxide surface is fully covered with the Li compound, there is no surface with which the Li ions coming from the electrolysis solution can be directly reacted, thus increasing the resistance. However, when there is no Li compound on the Li—Ni oxide surface like later-described Comparative Examples, not only the swelling of the battery cannot be suppressed, but also the Li—Ni oxide surface and the electrolysis solution are reacted with each other to increase the resistance.

To a method of depositing the Li compound on the lithium-nickel oxide surface, both wet and dry methods are applicable. In the wet method among these methods, when the Li—Ni oxide is fabricated by coprecipitation, the Li compound is mixed with the raw material of the Li—Ni oxide before coprecipitation, coprecipitated, thermally decomposed, and baked. On the other hand, in the dry method, the Li compound is mixed with the positive electrode active material fabricated by the above wet method without mixing the Li compound for dry blending. The mixing can be performed by applying any method or device such as a hybridization system (NARA MACHINARY CO., LTD.), COSMOS (Kawasaki Heavy Industries, Ltd.), Mechanofusion (Hosokawa Micron), Surfusing System (Nippon Pneumatic Mfg, CO., Ltd.), and Mechanomill, Speed kneader, Speed mill, and Spiracoater (OKADA SEIKO CO., LTD.). If necessary, the resultant is then heated. The Li—Ni oxide with the Li compound deposited on the surface thereof can be thus obtained.

In the case where the Li compound 13 is deposited to cover the surface of the Li—Ni oxide 11 as shown in FIG. 1, it is desirable that thickness of the cover layer of the Li compound ranges from 5 nm to 1 μm, preferably, from 50 nm to 1 μm, and more preferably, from 70 to 700 nm. When the thickness of the cover layer is smaller than 5 nm, it is sometimes difficult to sufficiently suppress the generation of oxygen radicals from the Li—Ni oxide, thus making it difficult to sufficiently prevent decomposition of the electrolysis solution. On the other hand, when the thickness of the cover layer is larger than 1 μm, the resistance increases although the Li compound includes the Li-ion conductivity, which could affect on high reactivity of the positive electrode active material. The thickness of the cover layer can be measured by TEM observation of cross-sections of particles.

In the case where the Li compound 13 is deposited to sprinkle on the surface of the Li—Ni oxide 11 as shown in FIG. 2, it is desirable that volume of the Li compound ranges from 0.5 to 10 when volume of the positive electrode active material is set to 100, and preferably, ranges from 0.7 to 7. When the volume of the Li compound is less than 0.5 with respect to the volume of the positive electrode active material set to 100, the Li compound which can sprinkle on the surface of the Li—Ni oxide is limited, and accordingly, it is sometimes difficult for the action of the Li compound to sufficiently suppress the generation of oxygen radicals from the Li—Ni oxide. On the other hand, when the volume of the Li compound is more than 10 with respect to the volume of the positive electrode active material set to 100, the Li compound covers the substantially entire surface of the Li—Ni oxide and is difficult to sprinkle. In addition, an amount of Li compound not directly involved in the reaction increases, which could affect on the high reactivity of the positive electrode active material although the Li compound includes the Li-ion conductivity. The amount of the Li compound is based on the volume of the positive electrode active material set to 100, but actually, in the light of preventing the generation of oxygen radicals in the Li—Ni oxide as the positive electrode active material, it is more desirable to set a volume of the Li—Ni oxide to 100 as the base. Specifically, it is more desirable that the volume of the Li compound ranges from 0.5 to 10 with respect to the volume of the Li—Ni oxide set to 100, and preferably, ranges from 0.8 to 8. The volume of the Li compound can be measured by SEM observation, TEM observation, or the like.

The positive electrode material for a lithium ion battery of the present invention only needs to contain the aforementioned Li—Ni oxide with the Li compound deposited on the surface thereof. In addition thereto, the positive electrode material can arbitrarily contain other positive electrode materials if needed. These materials are described below.

Other materials which can be used in the positive electrode material of the present invention can be a conducive material for increasing electron conductivity, a binder, a supporting salt (lithium salt) for increasing the ion conductivity, a polymer gel electrolyte or solid electrolyte (host polymer, electrolysis solution, or the like), and the like. When the polymer gel electrolyte is used in the electrolyte layer interposed between positive and negative electrodes, the binder, conductive material, and the like should be contained, but the electrolysis solution, lithium salt, and the like are not necessarily contained. When an electrolyte in a solution form is used in the electrolyte layer, the host polymer, electrolysis solution, lithium salt, and the like are not necessarily contained in the positive electrode material.

The aforementioned conductive material is acetylene black, carbon black, graphite, vapor-grown carbon fiber (VGCF), or the like. The aforementioned binder can be polyvinylidene fluoride (PVDF), styrene-butadiene rubber (SBR), polyimide, or the like.

The aforementioned polymer gel electrolyte is an ion conductive solid polymer electrolyte containing an electrolysis solution used in the non-aqueous electrolyte lithium ion battery or, in addition, is a polymer without the lithium-ion conductivity having a same electrolysis solution held in a skeleton thereof.

Herein, for the supporting salt of the electrolysis solution contained in the polymer gel electrolyte, it is possible to use at least one type of lithium salt (supporting salt) selected from inorganic acid anion salts such as $LiPF_6$, $LiBF_4$, $LiClO_4$, $LiAsF_6$, $LiTaF_6$, $LiAlCl_4$, and $Li_2B_{10}C_{10}$ and organic acid anion salts such as $LiCF_3SO_3$, $Li(CF_3SO_2)_2N$, and $Li(C_2F_5SO_2)_2N$. For a plasticizer of the electrolysis solution, it is possible to use aprotic solvent and the like of at least one type or a mixture of two or more selected from cyclic carbonates such as propylene carbonate and ethylene carbonate; acyclic carbonates such as dimethyl carbonate, ethyl methyl carbonate, and diethyl carbonate; ethers such as tetrahydrofuran, 2-methyl tetrahydrofuran, 1,4-dioxane, 1,2-dimethoxyethane, and 1,2-dibutoxyethane; lactones such as γ-butyrolactone; nitrites such as acetonitrile; esters such as methyl propionate; amides such as dimethylformamide; methyl acetate; and methyl formate.

For the ion conductive solid polymer electrolyte, it is possible to use, for example, polyethylene oxide (PEO), polypropylene oxide (PPO), and copolymer thereof.

For the polymer with no lithium-ion conductivity for use in the polymer gel electrolyte, it is possible to use, for example, polyvinylidene fluoride (PVDF), polyvinylchloride (PVC), polyacrylonitrile (PAN), polymethylmethacrylate (PMMA), or the like. PAN, PMMA, and the like rather fall into a category with little ion conductivity. PAN, PMMA, and the like can be considered as the aforementioned ion conductive polymer, but herein, are exemplified as the polymer with no lithium-ion conductivity for use in the polymer gel electrolyte.

For the supporting salt for increasing the ion conductivity, it is possible to use, for example, an inorganic acid anion salt such as $LiPF_6$, $LiBF_4$, $LiClO_4$, $LiAsF_6$, $LiTaF_6$, $LiAlCl_4$, and $Li_2B_{10}C_{10}$, an organic acid anion salt such as $LiCF_3SO_3$, $Li(CF_3SO_2)_2N$, and $Li(C_2F_5SO_2)_2N$, and a mixture thereof.

The mass ratio of the host polymer to the electrolyte in the polymer gel electrolyte can be determined according to an intended use, and specifically, it is preferable that the mass ratio ranges from 2/98 to 90/100. In other words, in the light of preventing the electrolysis solution from being decomposed by emitting oxygen radicals from the Li—Ni oxide, the present invention effectively acts on especially the electrolyte in a solution form (electrolysis solution) or polymer gel electrolyte among the non-aqueous electrolytes. Accordingly, in terms of the mass ratio of the host polymer to the electrolyte in the polymer gel electrolyte, the amount of electrolysis solution is not necessarily limited for the purpose of preventing swelling of the battery due to decomposition of the electrolysis solution, and the battery properties are preferentially considered.

Amounts of the Li—Ni oxide with the Li compound deposited on the surface thereof and, other than the Li—Ni oxide, the positive electrode active material, the conductive material, the binder, the polymer electrolyte (host polymer, electrolysis solution, or the like), and the lithium salt should be determined in consideration of the intended use of the battery (output-conscious, energy-conscious, or the like) and ion conductivity.

The positive electrode material of the present invention is widely applicable to the non-aqueous electrolyte lithium ion battery. The positive electrode can achieve, especially, high energy density and high output density and can be suitably used for a drive power supply of a vehicle. In addition, the positive electrode material is sufficiently applicable to a non-aqueous electrolyte secondary battery for a portable device such as a mobile phone. The following description is given of the non-aqueous electrolyte lithium ion secondary battery including the positive electrode material of the present invention.

The lithium ion battery which is a target of the present invention only needs to include the positive electrode material of the present invention, and the other components should not be limited. For example, in the case of distinguishing the lithium ion battery based on the form of usage, the aforementioned lithium ion battery is applicable to any form of primary and secondary batteries. In the case of distinguishing the lithium ion battery based on the form and structure, the aforementioned lithium ion battery is applicable to any of a laminate type (flat type) battery, a wound type (cylindrical type) battery, and the like. From a viewpoint of an electrical connection form within the lithium ion battery, the lithium ion battery is applicable to any of a bipolar battery and a battery which is not bipolar. As for the bipolar battery, it is possible to constitute a battery with larger voltage of a single cell, larger capacity, and more excellent output properties than those of a usual battery. Since the polymer battery causes no liquid leakage, the polymer battery has no problem of liquid junction and is highly reliable. Moreover, the polymer battery has an advantage in being able to form a non-aqueous battery with excellent output properties in a simple structure. Moreover, employment of the laminate structure allows long-term reliability to be ensured by a simple sealing technology such as thermocompression bonding and is advantageous in terms of costs and workability.

The following description is given of non-aqueous electrolyte lithium ion secondary batteries each including the positive electrode material of the present invention, which are bipolar and not bipolar, with reference to the drawings.

Figure 3:
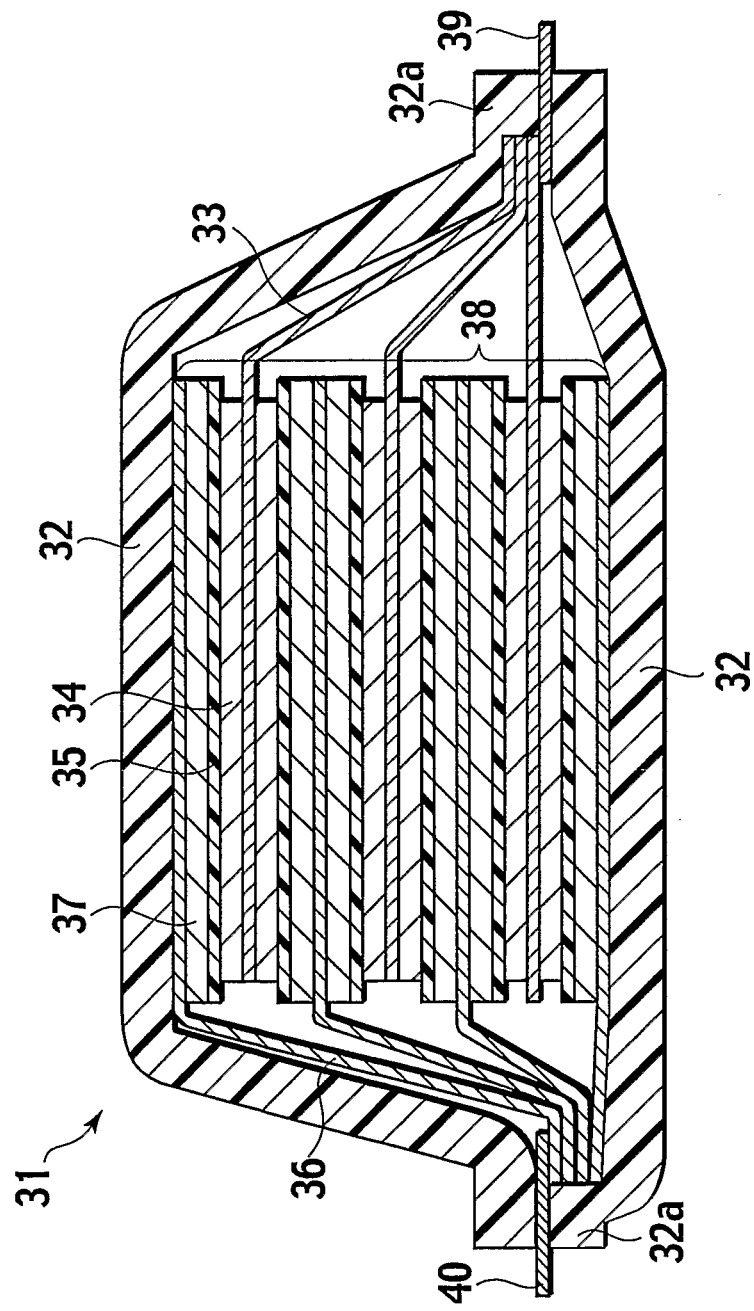
FIG. 3 is a cross-sectional view schematically showing a lithium ion secondary battery which is not a bipolar type.

FIG. 3 shows a laminate-type non-aqueous electrolyte lithium ion secondary battery 31 which is not bipolar. In the lithium ion secondary battery 31, a laminate film composed of a combination of polymer and metal is used for a battery sheath member 32, and the entire periphery of the battery sheath member 32 is joined by heat seal to seal off an electric-power generating element 38. The electric-power generating element 38 includes positive electrode plates and negative electrode plates stacked on each other. In each of the positive electrode plates, positive electrode active material layers 34 are formed on both sides of a positive electrode collector 33. In each of the negative electrode plates, negative electrode active material layers 37 are formed on both sides of a negative electrode collector 36. Positive and negative electrode leads 39 and 40 electrically connected to the aforementioned positive and negative electrode plates are attached to the positive and negative electrode collectors 33 and 36, respectively, by ultrasonic welding, resistance welding, or the like. The positive and negative electrode leads 39 and 40 are sandwiched between thermally welded portions 32a and exposed to the outside of the battery sheath member 32.

Figure 4:
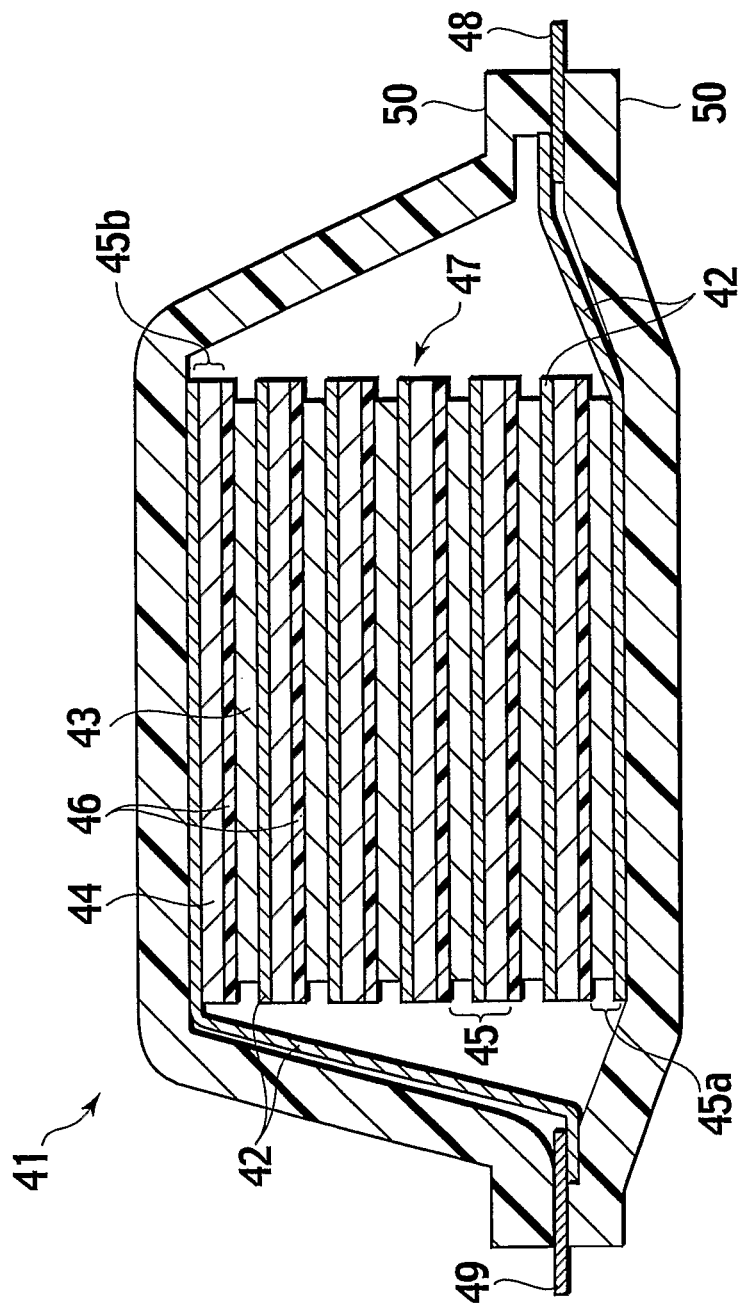
FIG. 4 is a cross-sectional view schematically showing a bipolar-type lithium ion secondary battery.

FIG. 4 shows an entire structure of a bipolar type non-aqueous lithium ion secondary battery (bipolar battery). A bipolar battery 41 includes an electric-power generating element 47 having a structure in which a plurality of bipolar electrodes 45 are stacked on each other with an electrolyte layer 46 interposed therebetween. Each of the bipolar electrodes includes a positive electrode active material layer 43 on one side of a collector 42 and a negative electrode active material layer 44 on the other side thereof. Electrodes 45a and 45b in the topmost and bottommost layers of the electric-power generating element 47 do not necessarily have a bipolar electrode structure and may have a structure in which the positive electrode active material layer 43 or the negative electrode active material layer 44 is arranged on the collector 42. In the bipolar battery 41, positive and negative electrode leads 48, 49 are joined to the collectors 42 at the upper and lower ends, respectively.

The number of the bipolar electrode 45 stacked (including the electrodes 45a, 45b) is adjusted according to desired voltage. In the bipolar battery 41, if sufficient output can be secured even when the thickness of the battery is reduced as much as possible, the number of the bipolar electrodes 45 stacked may be reduced. In the bipolar battery 41 of the present invention, in order to prevent external shocks in use and environmental degradation, it is preferable that the electric-power generating element 47 is sealed in a battery sheath member 50 under reduced pressure, the electrode leads 48, 49 are exposed to the outside of the battery sheath member 50. The basic structure of this bipolar battery 41 is a structure in which a plurality of unit cells stacked are connected to each other in series. This bipolar-type non-aqueous electrolyte lithium ion secondary battery is basically the same as the aforementioned non-aqueous electrolyte lithium ion secondary battery which is not bipolar except the different electrode structure thereof, and the following description is given of each component together.

(Collector)

For the collector which can be used in the present invention, it is possible to preferably use an aluminum foil, a stainless foil (SUS), a clad material of nickel and aluminum, a clad material of copper and aluminum, a clad material of SUS and aluminum, and a plated material of a combination of these metals. The collector may be composed of metal whose surface is coated with aluminum. In some cases, it is possible to use a collector including two or more metallic foils stuck to each other. In the case of using a composite collector, examples used as the material of the positive electrode collector can be conductive metal such as aluminum, aluminum alloy, SUS, and titanium, and aluminum is especially preferred. On the other hand, examples of the material of the negative electrode collector can be conductive material such as copper, nickel, silver, and SUS, and SUS, nickel, and the like are especially preferred. In the composite collector, the collectors only need to be electrically connected to each other directly or through a conductive intermediate layer made of a third material. Each of the positive and negative electrode collectors can be composed of a lath plate, in addition to a plate. The lath plate includes mesh space which is formed by expanding a plate with cuts thereon.

The thickness of the collector is, not particularly limited, usually about 1 to 100 μm.

(Positive Electrode Active Material Layer)

Materials constituting the positive electrode active material layer are characterized by using the positive electrode material of the present invention and have been already described. The description thereof is omitted here.

The thickness of the positive electrode active material layer is not particularly limited and should be determined in consideration of the intended use of the battery (output-conscious, energy-conscious, and the like) and ion conductivity.

The thickness of a general positive electrode active material layer is about 1 to 500 μm, and this range can be sufficiently applied to the present invention, too. However, for effectively developing the function of the positive electrode material of the present invention, it is desirable that the thickness thereof ranges from 4 to 60 μm in particular.

(Negative Electrode Active Material Layer)

The negative electrode active material layer contains a negative electrode active material. In addition thereto, a conductive material for increasing the electron conductivity, a binder, a supporting salt (lithium salt) for increasing the ion conductivity, a polymer gel electrolyte or solid electrolyte (host polymer, electrolysis solution, or the like), and the like can be contained. These are basically the same as those described in the section of the positive electrode material of the present invention other than the kind of the negative electrode active material, and the description thereof is omitted.

For the negative electrode active material, it is desirable to use as a main material at least one selected from natural graphite, artificial graphite, amorphous carbon, coke, mesophase pitch-based carbon fibers, graphite, and hard carbon which is amorphous carbon. In addition thereto, a metal oxide (especially, transition metal oxide, specifically, titanium oxide), a composite oxide of metal (especially, transition metal, specifically, titanium) and lithium, and the like can be used.

(Non-Aqueous Electrolyte Layer)

In the present invention, according to the intended use, any of (a) a separator with the electrolysis solution infiltrated therein, (b) polymer gel electrolyte, and (c) solid polymer electrolyte can be applied.

(a) Separator with the electrolysis solution infiltrated

For the electrolysis solution which can be infiltrated in the separator, it is possible to use a same electrolysis solution (electrolyte salt and plasticizer) as that contained in the polymer gel electrolyte which has been already described in the section of the positive electrode material of the present invention. Specifically, it is desirable to use as the electrolyte salt at least one of $LiClO_4$, $LiAsF_6$, $LiPF_5$, $LiBOB$, $LiCF_3SO_3$, and $Li(CF_3SO_2)_2$ and use as the plasticizer at least one of ethers consisting ethylene carbonate (EC), propylene carbonate, diethyl carbonate (DEC), dimethyl carbonate, methyl ethyl carbonate, 1,2-dimethoxyethane, 1,2-diethoxyethane, tetrahydrofuran, 1,3-dioxolane, and γ-butyrolactone. It is desirable to use an electrolysis solution with a concentration of the electrolyte salt which is adjusted to 0.5 to 2 mol/liter by dissolving the above electrolyte salt in the above plasticizer.

For the aforementioned separator, it is possible to use a porous sheet made of polymer absorbing and holding the above electrolysis solution (for example, polyolefin-based microporous separator or the like), a nonwoven fabric separator, and the like. The polyolefin-based microporous separator having a nature chemically stable against an organic solvent has an excellent effect on keeping low reactivity with the electrolysis solution.

The material of the porous sheet such as the polyolefin-based microporous separator is polyethylene (PE), polypropylene (PP), a laminated body with a three-layer structure of PP/PE/PP, polyimide, or the like.

The material of the nonwoven fabric separator is cotton, rayon, acetate, nylon, polyester, polypropylene, polyolefin such as polyethylene, polyimide, aramid, and the like, and these substances can be used singly or in combination according to the intended use (mechanical strength required for the electrolyte layer).

Bulk density of the nonwoven fabric only needs to be set so that the infiltrated polymer gel electrolyte offers adequate battery properties. Specifically, when the bulk density of the nonwoven fabric is excessively large, the proportion of the non-aqueous electrolyte material within the electrolyte layer is excessively large, and the ion-conductivity in the electrolyte layer might be reduced.

The thickness of the separator, which varies depending on the use application and is not uniquely defined, is desirably 5 to 200 μm for an application such as a motor drive secondary battery for electric vehicles (EVs), hybrid electric vehicles (HEVs), and the like. The separator with a thickness within this range can maintain the property of holding the electrolysis solution and can suppress an increase in resistance. In addition, the above range is desirable to prevent a short circuit caused by fine particles cutting into the separator and is desirable for a reason that narrowing the space between electrodes is desirable for high output. In the case of connecting a plurality of batteries, the area of the electrodes increases, and, to enhance the reliability of the battery, it is desirable to use a separator with a largest thickness within the above range.

The diameter of micropores of the separator (in particular, polyolefin-based microporous separator) is, desirably, not more than 1 μm. The separator including micropores with a mean diameter within the above range promptly causes a "shut down phenomenon" that the separator is melted by heat to close the micropores. This enhances reliability in an abnormal situation, and the heat resistance is therefore increased. Specifically, when battery temperature rises due to overcharging, the "shut down phenomenon" that the separator is melted to close the micropores is promptly caused. This prevents Li ions from passing the separator from the positive electrode side to the negative electrode side, and the battery cannot be further charged. Accordingly, the battery cannot be overcharged, thus eliminating overcharges. Therefore, battery safety is improved, and it is possible to prevent the heat sealed portions of the battery sheath member from being opened by generated gas. Herein, the mean diameter of micropores of the separator is calculated as a mean diameter by observing the separator with a scanning electron microscope or the like and statistically processing the photograph with an image analyzer or the like.

Porosity of the polyolefin-based microporous separator is, desirably, 20 to 50%. When the porosity of the separator is within the above range, in the light of preventing reduction in output due to the resistance of the electrolysis and preventing a short-circuit due to the fine particles penetrating pores within the separator, both the output and the reliability can be ensured. Herein, the porosity of the separator is a value obtained as a volume ratio from density of resin as the raw material and density of the separator of a finished product.

Porosity of the nonwoven fabric separator is, preferably, 50 to 90%. When the porosity is less than 50%, the property of holding the electrolysis is degraded, and when the porosity is more than 90%, the strength is insufficient.

In terms of the amount of electrolysis solution infiltrated into the above separator, the electrolysis solution should be infiltrated up to liquid holding capacity but may be infiltrated beyond the liquid holding capacity. This is because the electrolysis solution can be prevented from bleeding from the electrolyte layer by injecting resin into an electrolyte seal portion, and the electrolysis solution can be infiltrated as much as the electrolyte layer can hold. The electrolyte solution is held by complete sealing after injected by a vacuum injection method.

(b) Polymer Gel Electrolyte and (c) Solid Polymer Electrolyte

For the polymer gel electrolyte and solid polymer electrolyte, the same ones as the polymer gel electrolyte and solid polymer electrolyte already described in the section of the positive electrode material of the present invention, and the description thereof is omitted here.

The electrolyte layers of the above (a) to (c) can be used together in a single battery.

The polymer electrolytes can be contained in the polymer gel electrolyte layer, positive electrode active material layer, and negative electrode active material layer. It is possible to use a same polymer electrolyte or use a different polymer electrolyte in each layer.

The host polymer for the polymer gel electrolyte preferably used now is polyether-based polymer such as PEO and PPO. Accordingly, the resistance to oxidation on the positive electrode side is small under high temperature conditions. In the case of using the positive electrode material with high oxidation-reduction potential, preferably, the capacity of the negative electrode is smaller than the capacity of the positive electrode opposite to the negative electrode with the high gel electrolyte layer interposed therebetween. When the capacity of the negative electrode is smaller than that of the positive electrode opposite thereto, the potential of the positive electrode can be prevented from excessively rising in the end of charging. The capacities of the positive and negative electrodes can be calculated from manufacturing conditions as theoretical capacities in manufacturing the positive and negative electrodes. It is possible to directly measure the capacity of the finished product with a measuring device. However, when the capacity of the negative electrode is smaller than that of the positive electrode opposite thereto, the potential of the negative electrode might excessively drop to reduce the endurance of the battery, and the charge/discharge voltage therefore requires attention. The attention is paid not to reduce the endurance by, for example, setting average charge voltage of a cell to a proper value for the oxidation-reduction potential of the positive electrode active material used.

The thickness of the electrolyte layer constituting the battery is not particularly limited. However, to obtain a compact battery, it is preferable that the thickness thereof is reduced as much as possible to the extent that a function as the electrolyte can be ensured. The thickness of the electrolyte layer is, desirably, 5 to 200 μm.

(Insulation Layer)

The insulation layer is used mainly in the case of a bipolar-type battery. This insulation layer is formed around each electrode in order to prevent adjacent collectors in the battery comes into contact with each other and prevent short-circuits caused by a little irregularity in the end portions of the electrodes. In the present invention, the insulation layer can be provided around the electrodes when necessary. In the case of using the battery for the vehicle drive power supply or the auxiliary power supply, it is required to completely prevent short-circuits (liquid junctions) due to the electrolysis. Moreover, the battery is subjected to vibrations and shocks for long periods. In the light of increasing the battery life, providing the insulation layer is desirable to ensure the reliability and safety for long periods and desirable in providing a high-quality large capacity power supply.

For the insulation layer, it is sufficient if the layer includes insulation, sealing capability against loss of the solid electrolyte, tightness against permeation of moisture from the outside, heat resistance under battery operating temperature. Epoxy resin, rubber, polyethylene, polypropylene, polyimide, and the like can be used, and in the light of the corrosion resistance, chemical resistance, film forming property, and economical efficiency, epoxy resin is preferred.

(Positive and Negative Terminal Plates)

The positive and negative terminal plates can be used when needed. For example, in the case of a bipolar-type lithium ion battery, it is possible to directly take out electrode terminals from the outermost collectors, and in this case, the positive and negative terminal plates are not necessarily used (see FIG. 4).

In the case of using the positive and negative terminal plates, the positive and negative electrode terminal plates should include functions as a terminal as well as should be reduced in thickness as much as possible in the light of the reduction in thickness of the battery. However, since the stacked electrodes, electrolytes, and collectors have small mechanical strength, it is desirable to cause the terminal plates to have strength enough to sandwich and support these members on the both sides thereof. Moreover, in the light of suppressing the internal resistance in the terminal portions, usually, the thickness of the positive and negative terminal plates is desirably about 0.1 to 2 mm.

For the positive and negative terminal plates, it is possible to use aluminum, copper, titanium, nickel, stainless steel (SUS), alloys of these metals, and the like. In the light of the corrosion resistance, easy fabrication, economical efficiency, and the like, aluminum is preferred.

The positive and negative electrode terminal plates each may use a same material or different materials. Furthermore, the positive and negative terminal plates may be composed of different materials stacked into a multilayer structure.

(Positive and Negative Electrode Leads)

For metal used in the positive and negative electrode leads, it is possible to use a metal selected from copper and iron, and it is possible to similarly use a metal such as aluminum and stainless steel (SUS) and alloy materials including these metals. In the light of suppressing an increase in resistance of the entire leads, copper is desirable. Furthermore, in order to improve the adhesion to the polymer material of the battery sheath member, a surface coating layer may be formed on each lead. For the surface coating layer, nickel is most suitably used, but metal materials such as silver (Ag) and gold (Au) can be also used. Moreover, it is preferable that the portions exposed from the battery sheath member are coated with insulating heat shrinkable tubing having heat resistance so as not to come into contact with devices or wiring around the battery and cause a leak to affect on the electronics device and the like.

(Battery Sheath Member (Battery Casing))

In the lithium ion battery, not limited to the bipolar type, in order to prevent external shocks in use and environmental degradation, it is desirable to accommodate the electric-power generating element in the battery sheath member or battery casing. In the light of weight reduction, preferably, polymer-metal composite laminate films or the like are used, and a part or all of the peripheries thereof are joined to each other by heat seal to accommodate and seal the electric-power generating element. Each of the polymer-metal composite laminate films includes a metal such as aluminum, stainless, nickel, and copper coated with insulators such as polypropylene films on both sides thereof. In this case, the aforementioned positive and negative electrode leads should be structured so as to be sandwiched by the heat sealed portions and exposed to the outside of the battery sheath member. Use of the polymer-metal composite laminate film excellent in heat conductivity is preferable in that heat can be efficiently transmitted from a heat source of the vehicle and the inside of the battery can be quickly heated to the batter operating temperature. For the polymer-metal composite laminate film, it is possible to use a film in which a metal film arranged between polymer films and these films are integrated as a whole. A specific example is a film including a sheath protection layer (laminate outermost layer) composed of a polymer film, a metal film layer, and a heat sealing layer (laminate innermost layer) arranged in this manner and laminated to be integrated. Specifically, the polymer-metal composite laminate film is obtained by first, forming a heat-resistant insulating resin film on each side of a metal film as a polymer film and stacking the heat seal insulation film on at least the heat-resistant insulating resin film on one side. A laminate film is melted and bonded by heating with a proper method at the portion of the heat seal insulation film. Examples of the metal film are aluminum film and the like. Examples of the insulating resin film are polyethylene tetraphthalate (heat resistant insulation film), nylon film (heat resistant insulation film), polyethylene film (thermally fusing insulation film), polypropylene film (thermally fusing insulation film), and the like. The sheath member of the present invention should not be limited to these. With such laminate films, bonding of a pair of laminate films or a sheet of laminate film by heat seal can be performed easily and surely by using the thermally fusing insulation film by ultrasonic bonding or the like. In order to maximize the reliability of the battery for long periods, the metal films as components of the laminate sheet may be directly bonded. For removing or breaking the thermally fusing resin between the metal films to bond the metal films to each other, ultrasonic bonding can be used.

The lithium ion secondary battery of the present invention can be used as a high capacity power supply for electric vehicles (EVs), hybrid electric vehicles (HEVs), fuel cell vehicles, hybrid fuel cell vehicles, and the like. In other words, the lithium ion secondary battery of the present invention can be suitably used for the vehicle drive power supply or the auxiliary power supply requiring high energy density and high output density. In this case, it is desirable that a plurality of the lithium ion batteries of the present invention are connected to constitute an assembled battery. In other words, in the present invention, a plurality of the lithium-ion secondary batteries can be connected in parallel or in series into an assembled battery. Therefore, requirements for capacity and voltage in each type of vehicles can be achieved by a combination of base batteries. It is therefore possible to facilitate selection of necessary energy and output in designing. This eliminates the need for designing and producing batteries different for each type of vehicles, which can allow mass-production of the base batteries and reduce the costs by the mass-production. Hereinafter, a brief description is given of a typical embodiment of the assembled battery using the drawings.

Figure 5C:
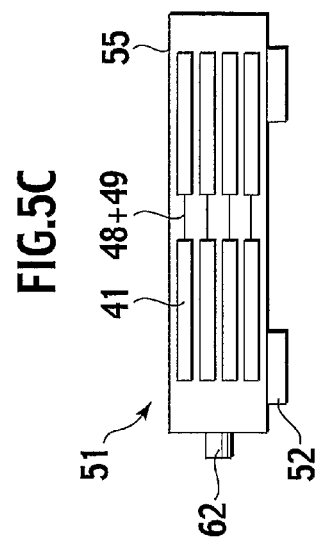
FIG. 5C is a side view showing the assembled battery using the lithium ion secondary battery of the present invention.
Figure 5A:
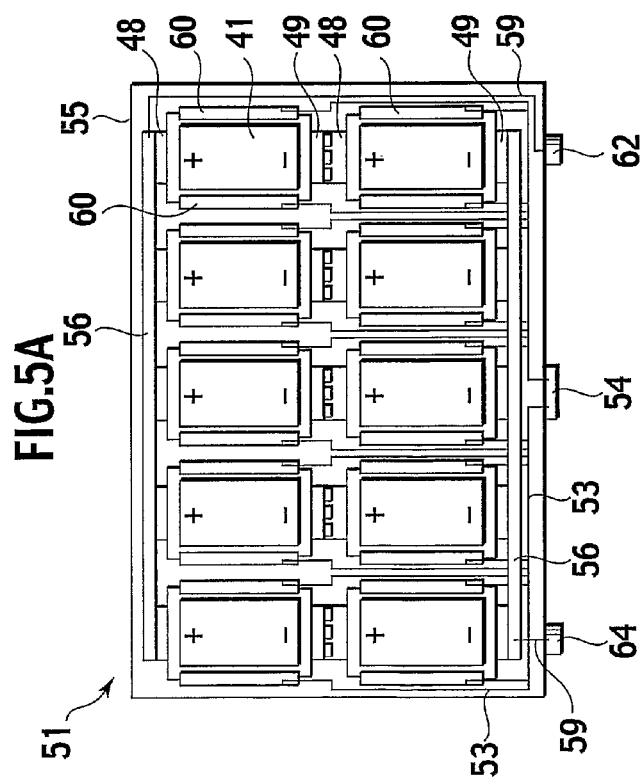
FIG. 5A is a plan view showing an assembled battery using the lithium ion secondary battery of the present invention.
Figure 5B:
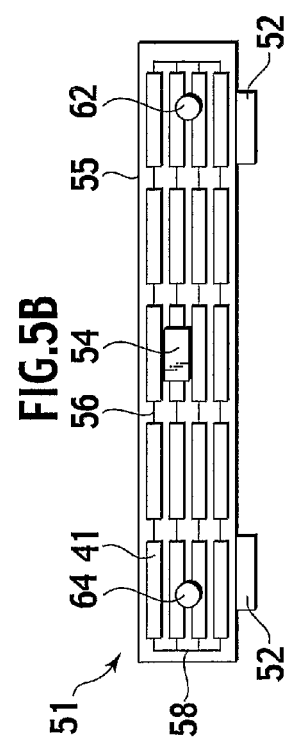
FIG. 5B is a front view showing the assembled battery using the lithium ion secondary battery of the present invention.

FIGS. 5A to 5C show an assembled battery (42 V, 1 Ah) including twenty batteries connected in parallel, each battery having two bipolar batteries (24V, 50 mAh) of the present invention in series. In the parallel connection part, leads are connected to bus-bars 56, 58 of copper, and in the serial connection part, leads 48, 49 are connected to each other by vibration welding. End portions of each serial connection part are connected to terminals 62, 64 to form positive and negative terminals. On each side of each battery, a detection tab 60 for detecting voltage of each layer of the bipolar battery 41 is exposed, and detection lines 53 thereof are drawn out to front part of the assembled battery 51. To form the assembled battery 51 shown in FIGS. 5A to 5C, five bipolar batteries 41 are connected in parallel with the bus-bar 56, and the five bipolar batteries 41 connected in parallel are further connected to another five bipolar batteries 41 connected in parallel with the bus-bar 56 in series by connecting the electrode leads to each other. Four layers thereof are stacked, connected in parallel by the bus-bars 58, and then accommodated in an assembled battery casing. In this manner, connecting any pieces of the bipolar batteries 41 allows to provide the assembled battery 51 achieving desired current, voltage, and capacity. In the assembled battery 51, a positive terminal 62 and a negative terminal 64 are formed in the front part of a side face of the assembled battery casing 55, after connecting the batteries, the bus-bars 56 and the positive and negative terminals 62, 64 are connected to each other with terminal leads 59. In the assembled battery 51, a detection terminal 54 is provided in the side face of the assembled battery casing 55 to monitor the battery voltage (voltages of each unit cell and the bipolar battery). All the detection tabs 60 of the bipolar batteries 41 are connected to the detection terminal 54 through the detection lines 53. In the bottom portion of the assembled battery casing 55, elastic bodies 52 are provided. In the case where a plurality of the assembled batteries 51 are stacked to form a combined assembled battery, the elastic bodies 52 can keep the distance between the assembled batteries 51 to improve vibration absorption, shock-resistance, insulation, and heat radiation.

This assembled battery 51 may be provided with various types of measuring devices or controllers in addition to the aforementioned detection terminal 54 according to the use application. Furthermore, for connecting the leads 48, 49 of the bipolar batteries 41 to each other or connecting the detection tabs 60 and the detection lines 53, it is possible to use ultrasonic welding, hot welding, laser welding, or electron beam welding or use rivets or caulking. Moreover, to connect the bus-bars 56, 58 to the terminal leads 59 and the like, ultrasonic welding, hot welding, laser welding, and electron beam welding can be used.

For the elastic body 52, it is possible to use resin such as rubber, spring, or the like.

The assembled battery of the present invention may include the bipolar battery of the present invention and a battery group connected thereto in parallel. The battery group includes the same positive and negative electrode materials as the bipolar battery and has a same voltage as that of the bipolar battery by serially connecting not-bipolar batteries as many as the unit cells of the bipolar battery. In other words, for batteries forming an assembled battery, the bipolar batteries of the present invention and the non-bipolar batteries can be mixed. This allows the bipolar batteries, which are output-conscious, and the non-bipolar batteries, which are energy-conscious, to be combined to form an assembled battery and mutually offset weaknesses thereof. Accordingly, the weight and size of the assembled battery can be reduced. Which ratio of the bipolar batteries and non-bipolar batteries are mixed in is determined depending on safe performance and output performance required as the assembled battery.

FIGS. 6A to 6C show an assembled battery in which the bipolar battery 41 (42V, 50 mAh) and a battery group (42 V) are connected in parallel, the battery group including ten non-bipolar batteries 31 (4.2V, 1 Ah) connected in series. The battery group of the non-bipolar batteries 31 and the bipolar battery 41 have a same voltage to form a parallel connection in that state. This assembled battery 51A has a structure in which the bipolar battery 41 takes charge in the output while the battery group 31 of the non-bipolar batteries 31 takes charge in the energy. This is effective means for the assembled battery which is difficult to simultaneously achieve the required output and energy. Also in this assembled battery 51A, the copper bus-bars 56 are used for connection in the parallel connection parts and the parts connecting the batteries 31 adjacent in the horizontal direction in the drawing. The batteries 31 adjacent in the vertical direction in the drawing are connected by vibration welding of the leads 39 and 40. End portions of the parts connecting the non-bipolar batteries 31 and the bipolar battery 41 in parallel are connected to the terminals 62, 64 to form the positive and negative terminals. This assembled battery 51A is the same as the assembled battery 51 of FIGS. 5A to 5C except that the detection tabs 60 for detecting voltage of each layer of the bipolar battery 41 are exposed on both sides of the battery 41 and the detection lines thereof are drawn out to the front part of the assembled battery 51A. To form the assembled battery 51A shown in FIGS. 6A to 6C, ten pieces of the non-bipolar batteries 31 are vibration-welded with the bus-bars 56 serially from an end to be connected in series. Furthermore, the battery 41 and the serially connected batteries 31 at the both ends are connected in parallel with the bus-bars 56 and then accommodated in the assembled battery casing 55. Connecting the bipolar battery 41 in this manner allows to provide the assembled battery 51A capable of achieving desired current, voltage, and capacity. Also in the assembled battery 51A, the positive terminal 62 and the negative terminal 64 are formed in the front part of a side face of the casing 55, and the bus-bars 56 and the positive and negative terminals 62, 64 are connected to each other with the terminal leads 59. In the assembled battery 51A, the detection terminal 54 is provided in the side face of the casing 55 to monitor the battery voltages (voltages of each unit cell of the bipolar battery 41, the bipolar battery 41, and the non-bipolar battery 31). All the detection tabs 60 of the bipolar battery 41 are connected to the detection terminal 54 through the detection lines 53. In the bottom portion of the assembled battery casing 55, the elastic bodies 52 are attached. In the case where a plurality of the assembled batteries 51A are stacked to form a combined assembled battery, the elastic bodies 52 can keep the distance between the assembled batteries 51A to improve vibration absorption, shock-resistance, insulation, and heat radiation.

Moreover, the assembled battery of the present invention may have the following structure. The aforementioned bipolar batteries are connected in series and in parallel to form a first assembled battery unit, and secondary batteries which are not bipolar batteries are connected to form a second assembled battery unit having a same voltage as that of the first assembled battery unit. The first and second assembled battery units are connected in parallel into the assembled battery.

Next, when at least two of the aforementioned assembled batteries are connected in series, in parallel, or in a combination of series and parallel, requirements for the battery capacity and output for each intended use can be achieved at comparatively low costs without producing a new assembled battery. In other words, in the combined assembled battery of the present invention, first, base assembled batteries are fabricated, and these are combined into the assembled battery, which enables fabrication of a battery according to need. This eliminates the need for fabricating many types of the assembled batteries with different specifications, and the manufacturing costs can be reduced.

FIGS. 7A to 7C show a combined assembled battery (42 V, 6 Ah) in which six assembled batteries (42 V, 1 Ah) using the bipolar batteries shown in FIGS. 5A to 5C are connected in parallel. The assembled batteries constituting the combined assembled battery are integrated by joint plates and set-screws, and elastic bodies are provided between the assembled batteries to form a vibration-absorption structure. The terminals of the assembled batteries are connected with plate-shaped bus-bars. In other words, as shown in FIGS. 7A to 7C, to connect the aforementioned assembled batteries 51 into a combined assembled battery 70, the positive terminals 62 are electrically connected to each other with a positive-terminal coupling plate 72 including an outer positive-terminal portion, and the negative terminals 64 are connected to each other with a negative-terminal coupling plate 74 including an outer negative-terminal portion. On both side faces of each assembled battery casing 55, joint plates 76 are fixed with setscrews 77, thus connecting the assembled batteries 51. The positive and negative terminals 62 and 64 of each assembled batteries 51 are protected by positive and negative insulation covers, respectively, and are distinguished by color-coding with proper colors, for example, red and blue. In addition, the external elastic bodies 52 are set in the bottom portion of the assembled battery casing 55 to form a vibration-absorption structure.

In the aforementioned combined assembled battery, it is desirable for each of the plurality of assembled batteries constituting the combined assembled battery to be detachably connected. This is because, even when part of the batteries or the assembled batteries are broken, such a combined assembled battery can be repaired only by replacing the broken part.

A vehicle of the present invention is characterized by including the aforementioned assembled batteries and/or composite assembled batteries mounted thereon. By making the batteries lightweight and small, large space can remain within the vehicle. Moreover, miniaturization of the batteries allows the weight of the vehicle to be reduced.

Figure 8:
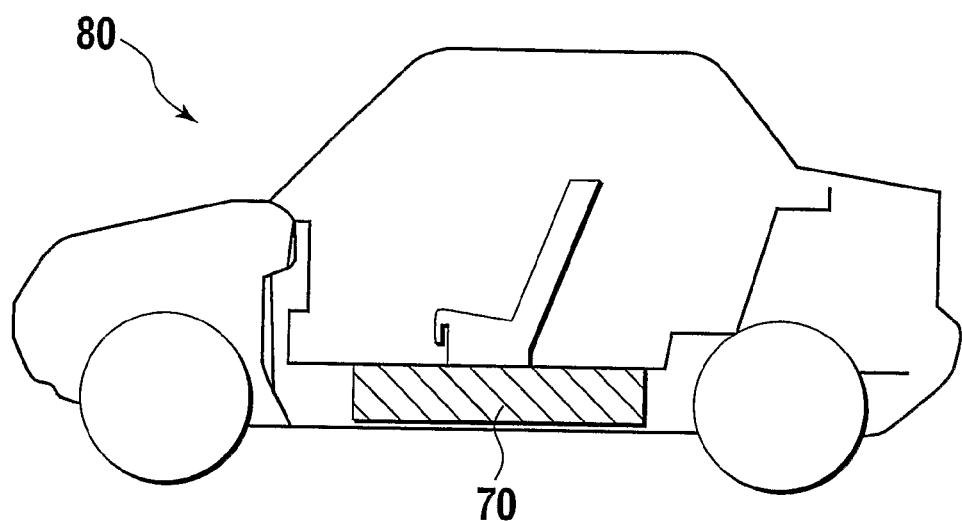
FIG. 8 is a schematic view showing a vehicle with the lithium ion secondary battery of the present invention mounted thereon.

As shown in FIG. 8, for being mounted on a vehicle 80, the combined assembled battery 70 is mounted under a seat in the center of the vehicle body. This is because the vehicle's internal space and a luggage room can be designed to be large when the battery 70 is mounted under the seat. A place where the battery is mounted is not limited to the place under the seat, but may be under the vehicle's floor, behind a seatback, a lower portion of the luggage room in the rear part, or an engine room in the front part of the vehicle.

In the present invention, not only the combined assembled battery, but also the assembled battery may be mounted on the vehicle depending on the use application, and a combination of these combined assembled battery and assembled battery may be mounted. Moreover, preferred vehicles on which the assembled battery and/or combined assembled battery of the present invention can be mounted as the drive power supply, auxiliary power supply, or the like, are electric vehicles, hybrid electric vehicles, fuel cell vehicles, hybrid fuel battery vehicles, or the like, but not limited to these.

Hereinafter, the contents of the present invention are described with Examples and Comparative Examples, but the present invention is not limited to these Examples.

Examples 1 to 42, 85, 86, and Comparative Examples 1 and 2

1. Fabrication of Positive Electrode

First, as shown in FIGS. 10 and 11, substances (Examples 1 to 42, 85, and 86) each including the Li compound with a thickness of 500 nm deposited and cover the surface of the Li—Ni oxide (mean particle diameter: 8 μm) and the Li—Ni oxide (Comparative Examples 1 to 2; no Li compound deposited) were fabricated. 75% by mass of the Li—Ni oxide, 10% by mass of acetylene black as the conductive material, 15% by mass of polyvinylidene fluoride were stirred with N-methyl-2-pyrrolidone added as a solvent to prepare a slurry. The slurry is applied on an aluminum foil (thickness: 20 μm) as the positive electrode collector with an applicator, and heated and dried at about 80° C. in a vacuum dryer. Subsequently, the electrodes with a diameter of 15 mm were stamped out from the aluminum foil and then dried at 90° C. under high vacuum for six hours. The thickness of the positive electrode active material layers stamped out was 50 μm. As for the method of covering the Li—Ni oxide with the Li compound, the Li—Ni oxide was covered with the Li compound using mechanofusion so as to have a covering thickness of 500 nm.

2. Fabrication of Negative Electrode

85% by mass of carbon of a carbon-based material as the negative electrode active material powder, 8% by mass of acetylene black as the conductive material, 2% by mass of vapor grown carbon fiber (VGCF), and 5% by mass of polyvinylidene fluoride as the binder were stirred with N-methyl-2-pyrrolidone added as a solvent to prepare a slurry. The slurry is applied on a copper foil (thickness: 20 μm) as the negative electrode collector with an applicator, and heated and dried at about 80° C. in a vacuum dryer. Subsequently, the electrodes with a diameter of 16 mm were stamped out from the copper foil and then dried at 90° C. under high vacuum for six hours. The thickness of the negative electrodes (negative electrode active material layers) stamped out was 80 μm.

3. Fabrication and Evaluation of Battery

Using the positive electrodes (Examples 1 to 42, 85, and 86 and Comparative Example 1 to 2) and the negative electrodes, each coin cell was formed. The coin cell was assembled using polypropylene (PP) based microporous separator (mean diameter of micropores: 800 nm, porosity: 35%, thickness: 30 μm) as the separator and using EC+DEC solution of $LiPF_6$ of 1.0 M as a non-aqueous electrolysis solution. In a balance of capacities of the positive and negative electrodes, the positive electrode was dominant.

Just after the fabrication of the cells, the cells were charged to 4.1 V at 0.2 C in conversion of the positive electrode. The cells were then maintained at room temperature for one week. Thereafter, the internal resistance was calculated with direct current, and the cells were further maintained at 4.1 V at 60° C. for one month. Thereafter, the internal resistance was calculated with direct current similarly to the initial calculation. The swelling of the coin cells was also measured. The obtained results are shown in FIGS. 10 and 11.

The internal resistance was calculated as a cell's internal resistance increase rate, and the swelling of the cells was measured as a swell rate of cell. The internal resistance increase rate (%) is an increase rate in internal resistance after each cell was maintained 60° C. for one month on the basis of the internal resistance just after the Li—Ni oxide not covered with the Li compound was fabricated. The swell rate of cell (%) was an increase rate in size of each cell after the cell was maintained at 60° C. for one month when the size of the cell with a SOC of 100% just after fabricated is set to 100%. The SOC (state of charge) is a value indicated by a ratio of charged capacity to cell's rated capacity.

Examples 43 to 84, 87, and 88 and Comparative Examples 3 and 4

First, as shown in FIGS. 12 and 13, substances (Examples 43 to 84, 87, and 88) each including the Li compound deposited to sprinkle on the surface of the Li—Ni oxide (mean particle diameter: 8 μm) so that the volume thereof was 1 with respect to the volume of the Li—Ni oxide of 100 were fabricated. Moreover, the Li—Ni oxide (mean particle diameter: 8 μm) (Comparative Examples 3 to 4; no Li compound deposited) were fabricated. Other than that, the positive and negative electrodes and the cells were fabricated and evaluated in a similar manner to Example 1. The obtained results are shown in FIGS. 12, 13.

From the results of FIGS. 10 to 13, it could be confirmed that the swell of the cells can be more suppressed in any case of Examples each including the substance as the positive electrode material in which the Li compound was deposited on the surface of the Li—Ni oxide than in Comparative Examples in each of which no Li compound was deposited on the surface of the Li—Ni oxide. Furthermore, in terms of the battery performance, it could be confirmed that the internal resistance increase rate after preservation could be controlled to be equal to or lower than that of the Comparative Examples. This revealed that the batteries with a high voltage (in a charged state) functioned well in charge and discharge when situated under an environment of high temperature (60° C. or higher) of about 60° C., specifically used in a vehicle, especially mounted in an engine room or near a motor. In other words, it was revealed that the batteries with a high voltage could effectively function even under high temperature without a problem that the reaction naturally progressed to generate gas or the internal resistance rises.

The entire contents of Japanese Patent Applications No. P2003-407542 with a filing date of Dec. 5, 2003 and No. P2004-334800 with a filing date of Nov. 18, 2004 are herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

INDUSTRIAL APPLICABILITY

According to the positive electrode material for a non-aqueous electrolyte lithium ion battery of the present invention, the Li compound is deposited on the surface of the Li—Ni oxide as the positive electrode active material, and generation of oxygen radicals from the Li—Ni oxide can be thereby dramatically suppressed even in charge and discharge at high temperature. Accordingly, it is possible to suppress decomposition of the electrolysis solution as much as possible and drastically reduce swelling of the batteries.

The invention claimed is:

1. A positive electrode material for non-aqueous electrolyte lithium ion battery, comprising:
   an oxide containing lithium and nickel; and
   a lithium compound deposited on a surface of the oxide,
   wherein the lithium compound is lithium sulfate.

2. A positive electrode material according to claim 1, wherein the lithium compound is deposited to cover substantially an entire surface of the oxide, and a thickness of a cover layer of the lithium compound ranges from 5 nm to 1 μm.

3. A positive electrode material according to claim 1, wherein the lithium compound is deposited to sprinkle on the surface of the oxide, and a volume of the lithium compound ranges from 0.5 to 10% with respect to a volume of the positive electrode active material.

4. A non-aqueous electrolyte lithium ion battery, comprising:
   a positive electrode active material layer comprising a positive electrode material according to claim 1;
   a negative electrode active material layer comprising a negative electrode active material; and
   an electrolyte layer disposed between the positive and negative electrode active materials layers.

* * * * *